United States Patent
Shivak

(10) Patent No.: US 9,894,829 B2
(45) Date of Patent: *Feb. 20, 2018

(54) IMPLEMENT FOR ADJUSTABLY METERING AN AGRICULTURAL FIELD INPUT ACCORDING TO DIFFERENT FRAME SECTIONS

(71) Applicant: Raven Industries, Inc., Sioux Falls, SD (US)

(72) Inventor: Stanislaus Montgomery Shivak, Stockholm (CA)

(73) Assignee: Raven Industries, Inc., Sioux Falls, SD (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/727,535

(22) Filed: Jun. 1, 2015

(65) Prior Publication Data

US 2015/0257331 A1    Sep. 17, 2015

Related U.S. Application Data

(63) Continuation of application No. 13/776,285, filed on Feb. 25, 2013, now Pat. No. 9,113,591.

(Continued)

(51) Int. Cl.
*A01C 7/04*    (2006.01)
*A01C 7/08*    (2006.01)
(Continued)

(52) U.S. Cl.
CPC .............. *A01C 7/081* (2013.01); *A01C 7/04* (2013.01); *A01C 7/042* (2013.01); *A01C 7/082* (2013.01);
(Continued)

(58) Field of Classification Search
CPC ........... A01C 7/04; A01C 7/042; A01C 7/044; A01C 17/00; A01C 7/082; A01C 7/084;
(Continued)

(56) References Cited

U.S. PATENT DOCUMENTS 5,337,959 A    8/1994 Boyd
5,635,911 A    6/1997 Landers et al.
(Continued)

FOREIGN PATENT DOCUMENTS

AU    725448    10/2000
AU    2004219715    9/2004
(Continued)

OTHER PUBLICATIONS

"Australian Application Serial No. 2013277513, Notice of Acceptance dated Nov. 8, 2016", 2 pgs.

(Continued)

*Primary Examiner* — Christopher J. Novosad
(74) *Attorney, Agent, or Firm* — Schwegman Lundberg & Woessner, P.A.

(57) ABSTRACT

A metering device for an agricultural implement to apply a field input, for example, pneumatically delivered granular product including seed or fertilizer, to an agricultural field. the rate of application of dispensers of one section of the implement can be collectively varied in relation to the rate of application of the dispensers of a different section of the implement frame.

24 Claims, 5 Drawing Sheets

Related U.S. Application Data

(60) Provisional application No. 61/661,181, filed on Jun. 18, 2012.

(51) Int. Cl.

| | | |
|---|---|---|
| *A01C 7/20* | (2006.01) | |
| *A01C 21/00* | (2006.01) | |
| *A01C 23/04* | (2006.01) | |
| *B05B 1/16* | (2006.01) | |
| *B05B 9/04* | (2006.01) | |
| *G05D 7/06* | (2006.01) | |
| *G05D 11/00* | (2006.01) | |
| *A01C 23/00* | (2006.01) | |
| *A01C 7/10* | (2006.01) | |

(52) U.S. Cl.
CPC ............ *A01C 7/084* (2013.01); *A01C 7/20* (2013.01); *A01C 21/005* (2013.01); *A01C 23/042* (2013.01); *B05B 1/169* (2013.01); *B05B 1/1681* (2013.01); *B05B 9/0406* (2013.01); *B05B 9/0423* (2013.01); *G05D 7/0605* (2013.01); *G05D 7/0641* (2013.01); *G05D 7/0652* (2013.01); *G05D 7/0664* (2013.01); *G05D 11/003* (2013.01); *A01C 7/102* (2013.01); *A01C 23/007* (2013.01)

(58) Field of Classification Search
CPC .......... A01C 7/08; A01C 7/20; A01C 21/005; A01C 21/00; A01C 23/042; A01C 23/04; A01C 23/00; A01C 7/081; B05B 1/1681; B05B 1/16; B05B 1/14; B05B 1/00; B05B 1/169; B05B 9/0406; B05B 9/0403; B05B 9/04; B05B 9/03; B05B 9/00; B05B 9/0423; G05D 7/0605; G05D 7/06; G05D 7/00; G05D 7/0641; G05D 7/0635; G05D 7/0629; G05D 7/0617; G05D 7/0652; G05D 7/0664; G05D 11/003; G05D 11/00
USPC .... 111/118, 130; 239/63, 76, 155, 159, 170, 239/172, 176, 548, 550, 551, 566, 146, 239/147, 163, 164, 565, 562, 556, 557; 700/231, 240, 241, 242, 244, 282, 283, 700/284; 701/50
See application file for complete search history.

(56) References Cited

U.S. PATENT DOCUMENTS

| | | |
|---|---|---|
| 5,653,389 A | 8/1997 | Henderson et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,936,234 A | 8/1999 | Thomas et al. |
| 5,938,071 A | 8/1999 | Sauder |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,093,926 A | 7/2000 | Mertins et al. |
| 6,122,581 A | 9/2000 | McQuinn |
| 6,145,455 A | 11/2000 | Gust et al. |
| 6,189,807 B1 | 2/2001 | Miller et al. |
| 6,199,000 B1 | 3/2001 | Keller et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,285,938 B1 | 9/2001 | Lang et al. |
| 6,373,057 B1 | 4/2002 | Penfold |
| 6,522,948 B1 | 2/2003 | Benneweis |
| 6,584,920 B1 | 7/2003 | Cresswell |
| 6,606,542 B2 | 8/2003 | Hauwiller et al. |
| 6,661,514 B1 | 12/2003 | Tevs et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,851,377 B2 | 2/2005 | Mayerle et al. |
| 6,877,675 B2 | 4/2005 | Benneweis |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,311,004 B2 | 12/2007 | Giles |
| 7,395,769 B2 | 7/2008 | Jensen |
| 7,472,660 B2 | 1/2009 | Mariman et al. |
| 7,478,603 B2 | 1/2009 | Riewerts et al. |
| 7,502,665 B2 | 3/2009 | Giles et al. |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,634,993 B2 | 1/2014 | McClure et al. |
| 8,635,963 B2 | 1/2014 | Friggstad |
| 8,733,257 B2 | 5/2014 | Beaujpt et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,868,300 B2 | 10/2014 | Kocer et al. |
| 8,915,200 B2 | 12/2014 | Barsi et al. |
| 9,113,591 B2 | 8/2015 | Shivak |
| 9,144,190 B2 | 9/2015 | Henry et al. |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2005/0000277 A1 | 1/2005 | Giles |
| 2005/0076818 A1 | 4/2005 | Grimm |
| 2006/0086295 A1 | 4/2006 | Jensen |
| 2006/0265106 A1 | 11/2006 | Giles et al. |
| 2006/0273189 A1 | 12/2006 | Grimm et al. |
| 2007/0039880 A1 | 2/2007 | Mayerle et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |

(56) References Cited

U.S. PATENT DOCUMENTS

| | | |
|---|---|---|
| 2009/0078178 A1 | 3/2009 | Beaujot |
| 2009/0101371 A1 | 4/2009 | Melanson et al. |
| 2009/0271136 A1 | 10/2009 | Beaujot et al. |
| 2010/0032492 A1 | 2/2010 | Grimm et al. |
| 2010/0101469 A1 | 4/2010 | Landphair et al. |
| 2010/0132600 A1 | 6/2010 | Dean et al. |
| 2011/0054743 A1 | 3/2011 | Kocer et al. |
| 2011/0179984 A1 | 7/2011 | Beaujot et al. |
| 2011/0210186 A1 | 9/2011 | Kugler et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0228395 A1 | 9/2012 | Needham |
| 2012/0271467 A1 | 10/2012 | Grimm et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0333601 A1 | 12/2013 | Shivak |
| 2014/0048002 A1 | 2/2014 | Grimm et al. |
| 2014/0216315 A1 | 8/2014 | Beaujot et al. |
| 2014/0299673 A1 | 10/2014 | Grimm et al. |
| 2014/0312141 A1 | 10/2014 | Ravishankar |

FOREIGN PATENT DOCUMENTS

| | | |
|---|---|---|
| AU | 2005247004 | 12/2006 |
| AU | 2006202376 | 12/2006 |
| AU | 2009203181 | 2/2010 |
| AU | 2012201357 | 9/2012 |
| AU | 2013203361 | 10/2013 |
| AU | 2013204455 | 3/2014 |
| AU | 2013248190 | 5/2014 |
| AU | 2013277513 B2 | 3/2017 |
| CA | 2229852 A1 | 8/1998 |
| CA | 2517031 A1 | 9/2004 |
| CA | 2528708 A1 | 11/2006 |
| CA | 2549300 A1 | 12/2006 |
| CA | 2674527 | 2/2010 |
| CA | 2770013 | 9/2012 |
| CA | 2811726 | 10/2013 |
| CA | 2813949 A1 | 2/2014 |
| CA | 2830306 | 4/2014 |
| CN | 202255911 U | 5/2012 |
| CN | 203264929 U | 11/2013 |
| DE | 102011053182 | 3/2013 |
| EP | 969712 | 1/2000 |
| EP | 0963255 B1 | 10/2002 |
| EP | 0847307 B2 | 1/2003 |
| EP | 1426112 B1 | 6/2011 |
| GB | 2322573 A | 9/1998 |
| JP | 2759711 B2 | 5/1998 |
| JP | 2005161221 A | 6/2005 |
| WO | WO-9837751 | 9/1998 |
| WO | WO-98/42178 A1 | 10/1998 |
| WO | WO-99/16007 A1 | 4/1999 |
| WO | WO-2004023865 | 3/2004 |
| WO | WO-2004081499 | 9/2004 |
| WO | WO-2008112930 A1 | 9/2008 |
| WO | WO-2010105221 A1 | 9/2010 |
| WO | WO-2012022903 A1 | 2/2012 |
| WO | WO-2013191990 A2 | 12/2013 |
| WO | WO-2013191990 A3 | 12/2013 |

OTHER PUBLICATIONS

"Australian Application Serial No. 2013277513, Response filed Oct. 28, 2016 to First Examiners Report dated Jul. 26, 2016", 20 pgs.

"U.S. Appl. No. 13/776,285, Non Final Office Action dated Jul. 30, 2014", 15 pgs.

"U.S. Appl. No. 13/776,285, Notice of Allowance dated Jan. 27, 2015", 5 pgs.

"U.S. Appl. No. 13/776,285, Notice of Allowance dated May 4, 2015", 6 pgs.

"U.S. Appl. No. 13/776,285, Response filed Dec. 30, 2014 to Non Final Office Action dated Jul. 30, 2014", 25 pgs.

"International Application Serial No. PCT/US2013/045445, International Preliminary Report on Patentability dated Dec. 31, 2014", 7 pgs.

"International Application Serial No. PCT/US2013/045445, International Search Report dated Nov. 27, 2013", 3 pgs.

"International Application Serial No. PCT/US2013/045445, Written Opinion dated Nov. 27, 2013", 9 pgs.

"Australian Application Serial No. 2013277513, First Examiners Report dated Jul. 26, 2016", 3 pgs.

"European Application Serial No. 13807150.1, Extended European Search Report dated Jan. 8, 2016", 8 pgs.

"European Application Serial No. 13807150.1, Office Action dated Feb. 3, 2015", 3 pgs.

"European Application Serial No. 13807150.1, Response filed Aug. 3, 2015 to Office Action dated Feb. 3, 2015", 10 pgs.

Dietz, John, "A five-part program for efficient farming", Farming, (Apr. 2000), 1-4.

"European Application Serial No. 13807150.1, Communication Pursuant to Article 94(3) EPC dated Nov. 8, 2017", 5 pgs.

IMPLEMENT FOR ADJUSTABLY METERING AN AGRICULTURAL FIELD INPUT ACCORDING TO DIFFERENT FRAME SECTIONS

RELATED APPLICATIONS

This patent application is a continuation of U.S. patent application Ser. No. 13/776,285, filed on Feb. 25, 2013, which claims the benefit of priority, under 35 U.S.C. § 119(e), to U.S. Provisional Patent Application Ser. No. 61/661,181, filed on Jun. 18, 2012, which is incorporated herein by reference in its entirety.

FIELD OF THE INVENTION

The present invention relates to metering devices for an agricultural implement for applying a field input, for example pneumatically delivered granular product including seed or fertilizer or sprayed liquid product including fertilizer and the like, to an agricultural field in which the rate of application of the dispensers of one section of the implement can be collectively varied in relation to the rate of application of the dispensers of a different section of the implement frame.

BACKGROUND

When supplying an input product to an agricultural field, for example seed or fertilizer with air seeding implements, or various liquid products with an agricultural sprayer, the input product is typically applied evenly across a width of the frame of the implement. The usual distribution pattern of an implement across an agricultural field is to pass along the field in longitudinal rows with the rows being connected to one another by 180° curved sections joining the ends of adjacent ones of the rows. At the outside of the curve however the implement passes much more ground than the inner portion of the curved section such that when the product is evenly dispersed across the width of the frame, the product is applied to the field at a rate which is too dense at the inside of the curved section and too sparse at the outside of the curved section.

SUMMARY OF THE INVENTION

According to one aspect of the invention there is provided an implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a product supply arranged to store the input product therein so as to be supported for movement across the field together with the frame;

a plurality of conveying lines communicating between the product supply and respective ones of the product dispensers;

a plurality of metering devices in which each metering device is associated with one of the designated frame sections and communicates with at least one main line in communication with the respective conveying lines of the product dispensers associated therewith;

the metering devices being arranged to meter the input product therethrough from the product supply to the respective conveying lines at an adjustable rate relative to one another.

By providing a separate metering device for each of a plurality of designated frame sections, the dispensing devices of one frame section can be operated at a different rate from the dispensing devices from a different frame section to compensating for different ground speeds at the inner end outer portions of a curved section.

Also when passing over an end row of a designated crop area which is less than the full width of the implement frame, the metering device supplying the dispensing devices of corresponding frame sections aligned outside of the crop boundary can be shut off to limit waste and further increase efficiency of input product application.

The variable metering can be accomplished by various means. In a seeding implement, metering can be accomplished by providing main pneumatic conveying lines which communicate with the seed tanks by their own respective metering devices or by providing separate tanks in which each tank includes its own respective metering device for metering product into pneumatic conveying lines associated with only one frame section of the overall frame. In each instance the metering devices are operable in response to various speed inputs which are measured or calculated using various means.

Alternatively in the instance of a sprayer, metering of the fluid to a centre frame section, a left frame section, and a right frame section can be controlled independently by using separate pumps for the left and right sections relative to the centre section, or by using pressure reducing or throttling type valves to supply one section relative to other sections which allow one section of individual spray nozzles to be adjusted independently of the spray nozzles of another section.

In yet further arrangements of agricultural sprayers, a common rate of carrier fluid can be sprayed from all nozzles; however, metering devices are used for metering the chemical concentration of various input products into the main conveying line supplying one section of the frame relative to the main conveying line supplying a different section of the frame.

According to a second aspect of the present invention there is provided a sprayer implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a carrier fluid supply arranged to store a carrier fluid therein so as to be supported for movement across the field together with the frame;

a plurality of main lines in communication with the carrier fluid supply to receive carrier fluid therefrom in which each main line is only associated with one of the designated frame sections;

a plurality of conveying lines, each communicating a respective one of the product dispensers to one of the main lines associated with the respective designated frame section to dispense carrier fluid from the main lines therethrough;

a primary product supply arranged to store a primary input product therein so as to be supported for movement across the field together with the frame;

a plurality of metering devices in which each metering device is associated with one of the designated frame sections and communicates with at least one main line associated with the designated frame section;

the metering devices being arranged to meter the primary input product therethrough at an adjustable rate from the primary product supply into carrier fluid in the respective conveying lines whereby a metered amount of the primary input product is dispensed from the product dispensers in each designated frame section independently of the other frame sections.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
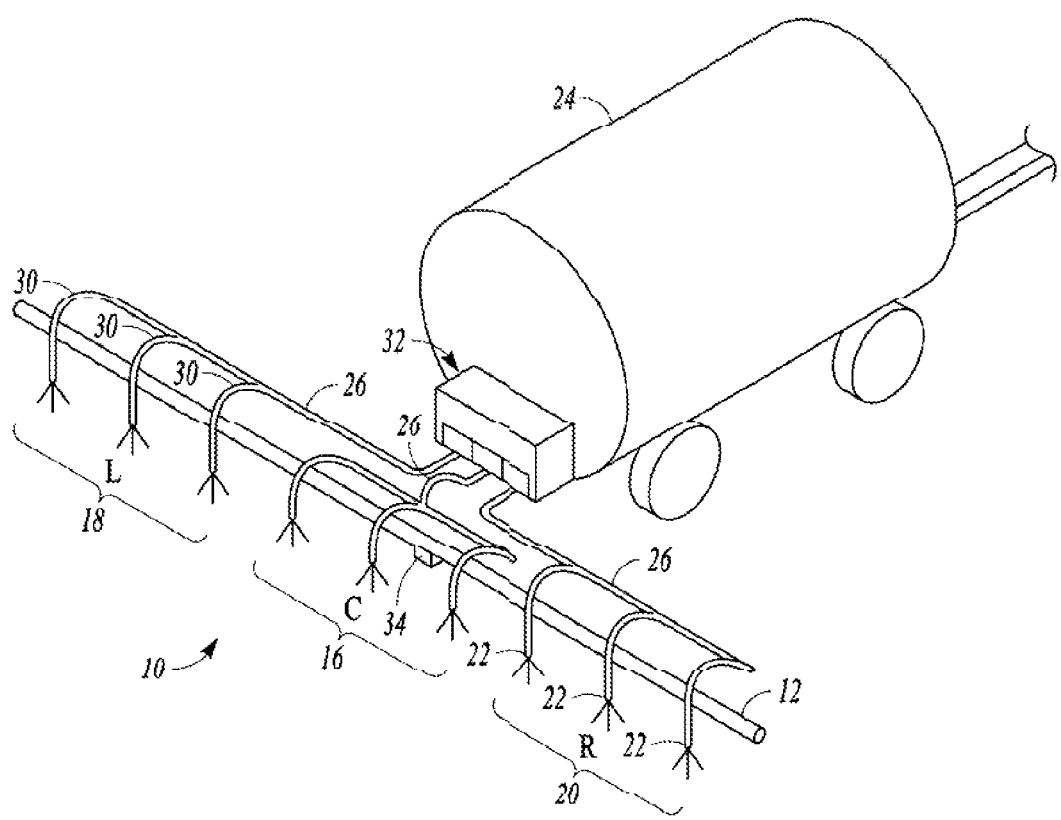
FIG. 1 is a schematic representation of one example of a sprayer implement to which the metering devices of the present invention can be applied.

Referring to the accompanying figures there is illustrated an agricultural implement for applying an input product, for example seed, granular fertilizer, liquid fertilizer and the like to an agricultural field. Although various embodiments are described and illustrated herein, the common features of the various embodiments will first be described.

In each instance, the agricultural implement 10 generally includes an implement frame 12 which is supported for movement across the ground in a forward working direction either by being supported on driven wheels or being towed by a tractor for example. The implement frame typically stands in a lateral direction perpendicular to the forward working direction and is separated into a plurality of designated frame sections 14. The frame sections may include one or more centre sections 16, one or more left wing sections 18 and one or more right wing sections 20.

In some instances, the center sections may be grouped with the winged sections such that the designated frame sections overall only comprise a left section and a right section. In each instance each frame sections extends laterally across a respective portion of the width of the frame so as not to overlap adjacent sections in the lateral direction and such that each designated frame section is positioned in series with the other frame sections in the lateral direction across the width.

A plurality of product dispensers 22 are supported on each frame section 14 such that the dispensers within each section are laterally spaced apart from one another and from the dispensers of adjacent sections. Each dispenser 22 is arranged to dispense respective product therethrough in a respective longitudinal row in the forward working direction. All of the dispensers of one designated frame section comprise a respective group of dispensers in which all of the dispensers of one group corresponding to one frame section are arranged to be commonly metered in rate relative to the rate of all dispensers of other groups in other frame sections.

The implement further includes an input product supply 24 typically in the form of a tank supporting the input product therein such that it is supported for movement across the field together with the implement frame 12 in the forward working direction. The tank may be supported on its own respective frame towed together with implement frame 12 or may be supported directly on the implement frame.

The input product is typically delivered from the product supply by a plurality of main lines 26 in communication with the supply which convey the product from the supply towards the designated frame sections. One or more main lines may be associated with each frame section for directing the product from the supply to one or more manifolds associated with the respective frame sections. The manifolds in turn redirect the supplied input product into a plurality of individual conveying lines 30 in which each conveying line is associated with only one respective product dispenser.

A plurality of metering devices 32 are supported with the input product supply 24 to meter the product from the supply into the main lines and the corresponding individual conveying lines to the product dispensers. One metering device 32 is associated with each designated frame section of the implement frame such that all of the product dispensers 22 of one respective frame section are commonly metered together by the respective metering device typically in communication between the product supply 24 and the main lines 26 upstream of the manifolds 28 and the individual conveying lines 30.

Figure 11:
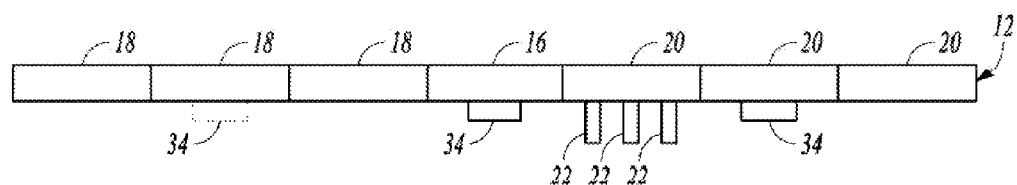
FIG. 11 is a schematic representation of an implement according to the present invention which is separated into a plurality of designated frame sections and which calculates a speed input for each designated frame section based on respective speed sensors.

Each metering device 32 is operable at a rate independently of the other metering devices in response to a respective speed input corresponding to the ground speed of the respective frame section with which the metering device is associated. The speed input is determined for each metering device either by providing a speed sensor 34 on each frame section for directly measuring the speed input for each metering device, or alternatively the speed input for each metering device can be calculated based on various measured inputs. For example, as shown in FIG. 11, one speed sensor may be centrally located to measure the average forward speed of the implement frame with at least one other speed sensor being provided at a laterally spaced location associated with one side section to determine if one side section is moving faster or slower than the central or average ground speed of the implement frame. This comparison permits corresponding calculation of the ground speed of the other side of the frame.

Speed calculation may be performed mechanically using a ground engaging wheel with a wheel rotation counter, by radar, or by GPS for example with the measured data being input into a computer controller which then calculates the appropriate speed input for each metering device representing an average forward ground speed of the respective designated frame section with which the metering device is associated and a corresponding metering rate.

Turning now to the embodiments of FIGS. 1 through 6, the implement frame in this instance comprises an agricultural sprayer such that the frame comprises a boom supported on a rolling vehicle chassis which also supports the input product supply 24 thereon in the form of a liquid tank. The overall metering system in this instance typically includes one pump 36 supplying an overall flow rate of product to the main lines as measured by a downstream flow rate sensor 38. The conveying lines in this instance comprise pressure fluid conveying lines while the product dispensers comprise nozzles which are spaced apart on the boom from which the product can be sprayed downwardly onto the ground. The frame sections typically comprise one center section 16 or one or more left wing sections with a corresponding number of right wing sections. The centre section is operated at an average rate which is determined by the average forward ground speed and which is the basis for the operation of a primary pump 36 when there is only one primary pump.

Figure 2:
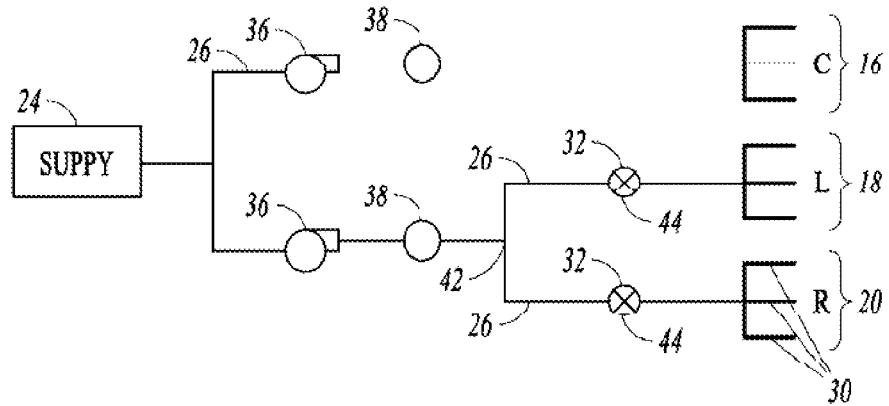
FIGS. 2 through 6 each schematically illustrate one respective embodiment of the metering system of the present invention applied to an agricultural sprayer.

Turning now more particularly to the embodiment of FIG. 2, in this instance two pumps are provided and each is arranged to be operated at a designated flow rate by adjusting the operating rate based on deviation of the flow rate measured by downstream flow rate sensors 38 from respective set point flow rates. The set point rates are the desired operating rates based on the calculated or measured speed input.

In the embodiment of FIG. 2 the main line to the center section is isolated from the other lines and is supplied with its own respective one of the pumps 40 with a flow rate sensor. The center pump 40 functions as the metering system for the main line of the center frame section. A branched line upstream from the center pump 40 communicates with the primary pump 36 supplying all other sections such that the combined flow rate of the centre pump and the primary pump 36 correspond to the overall desired flow rate for all sections during normal operation.

A primary manifold 42 downstream from the primary pump 36 splits the flow into a plurality of main lines associated with the plurality of side sections respectively. The metering device 32 of each side section in this instance comprises a suitable valve 44 connected in series with the mainline. The valve may comprise a throttling valve or a pressure reducing valve for example which is operable in response to a measured downstream flow rate sensor so that the flow in one side section can be adjusted relative to another side section while maintaining the overall flow rate consistent and while maintaining the flow rate in center section isolated from the adjusted flow rate of the side sections. Each valve 44 could also comprise a three way valve which allows some flow to be diverted from one side section to another side section.

Figure 3:
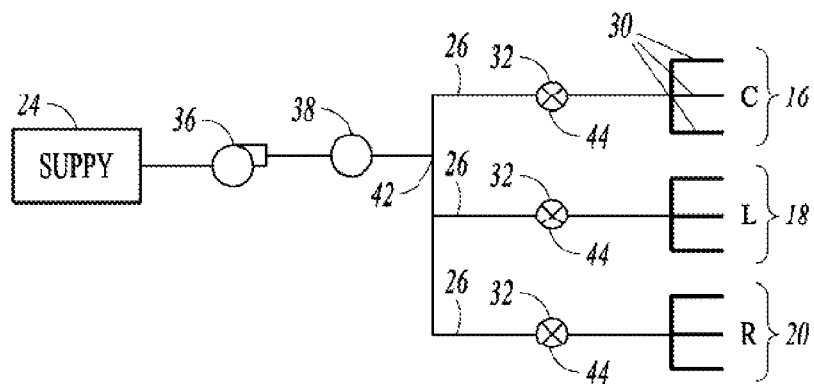

In the embodiment of FIG. 3 the primary pump 36 supplies the overall flow rate upstream from any of the metering devices to supply a primary manifold 42 which separates the line from the primary pump 36 into the individual main lines 26 which in turn supply the respective designed sections of the frame. Each main line in this instance is provided with its own pressure reducing valve 44 which is typically operated by pulse width modulation to maintain flow rate therethrough at a set point rate. The valve is operated to return the rate through the line to the set point rate whenever a downstream flow rate sensor detects that the actual measured rate deviates from the set point rate.

Figure 5:
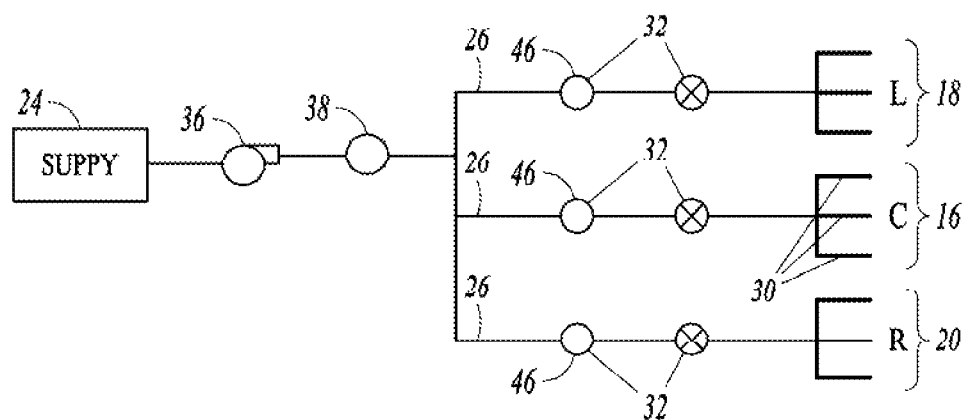

The embodiment of FIG. 5 is similar to the embodiment of FIG. 3 in that the primary pump provides a controlled flow rate to a primary manifold 42, however in this instance each of the main lines downstream from the primary manifold pass through a restricted orifice 46 defining part of the metering system of the main lines. The restricted orifices 46 step the pressure down before respective throttling valves 44 downstream from the orifices. The valves 44 define the metering devices in this instance. The throttling valves may be all operated in a partially restricted manner during normal operation with balanced flow such that one side section can be less restricted and another side section more restricted corresponding to outside and inside sections of a curved path for example to vary the flow between sections while maintaining the center section mainline substantially isolated and metered at a constant rate.

Figure 4:
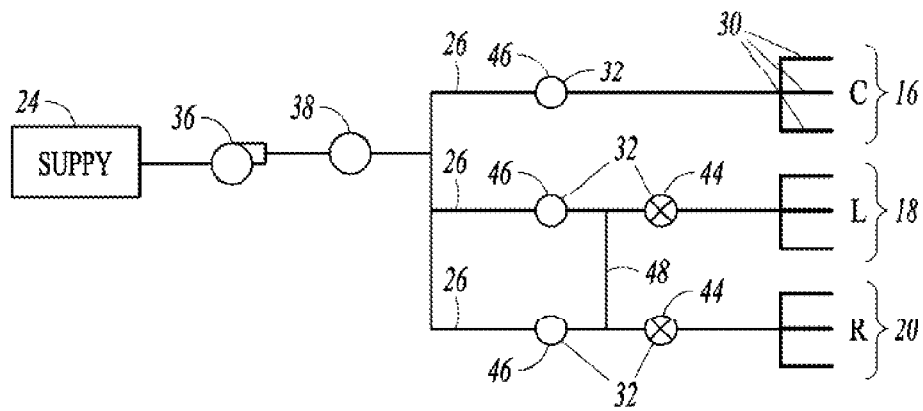

The embodiment of FIG. 4 may be arranged substantially identically to the embodiment of FIG. 5 with the exception of the metering device of the center section comprising only the restricted orifice 46 to maintain a constant metered flow rate to the center section. The remaining main lines corresponding to all of the side sections may be interconnected downstream from the restricted orifices by pressure balancing lines 48. The metering devices in this instance comprise throttling valves 44 downstream from the pressure balancing lines and the respective orifices 46 such that flow to one side section can be restricted while flow to another side section can be increased in proportion to the restriction to maintain overall flow at a constant rate as in previous embodiments while redirecting flow from one side to an opposing side of the frame.

Figure 6:
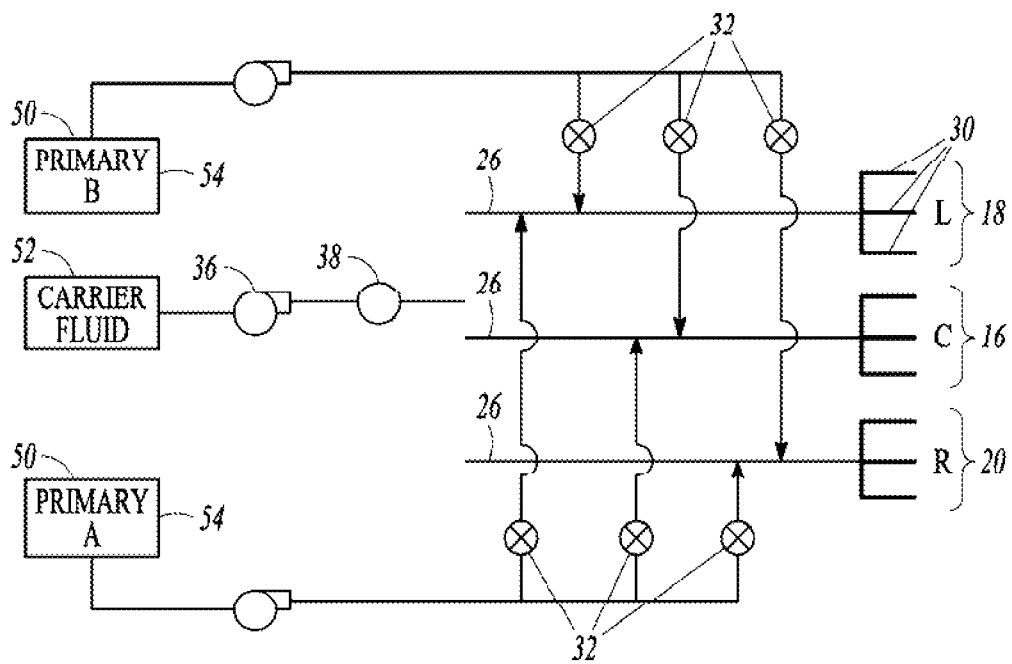
Figure 7:
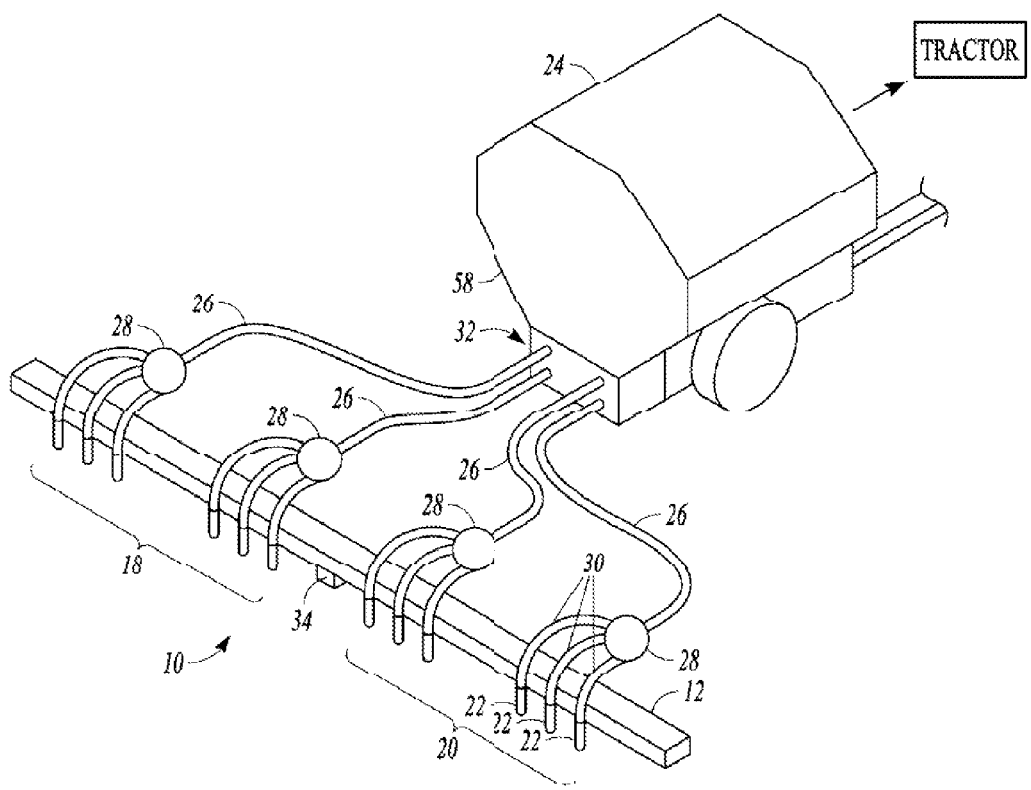
FIG. 7 is a schematic representation of one example of an agricultural air seeder to which the metering system of the present invention can be applied.

According to the embodiment of FIG. 6, a plurality of primary products 50 in the form of non diluted chemical to be applied to a field can be independently metered in concentration relative to a carrier fluid dispensed through the conveying lines. In this instance a main tank 52 of the sprayer comprises a carrier fluid supply connected by main lines 26 to the individual conveying lines 30 and subsequently the individual dispensers 22 substantially in the usual manner by supplying the carrier fluid therethrough from a primary pump 36 with an associated flow rate sensor 38.

Each primary product 50 includes its own product tank 54 which is connected to and supplies respective metering devices 32 associated with each main line of the carrier fluid and associated with each primary product. One metering device is thus associated with each primary product of each main line. Accordingly when there are two primary products as in the illustrated embodiment for communication with three main lines a total of 6 metering devices are used for metering each primary product into each main line.

Each metering device comprises a metered injector which is operable at a specified injection rate so as to be arranged to inject a metered amount of the primary product into the carrier fluid conveyed through the respective main line of a respective designated frame section independently of the other metering devices relating to other primary product or other main lines. The amount of carrier fluid remains constant in this instance but the concentration of primary products is varied so as to remain substantially constant within each center section, but can be increased or decreased in the side sections corresponding to inner or outer portions of a curved path, or all maintained at a constant concentration during normal longitudinal movement of the sprayer.

Turning now to embodiments of FIGS. 7 through 10 the implement in this instance comprises an air seeder such that the product supply comprises one or more tanks supported on a seed cart on wheels towed separately from the implement frame which comprises an air drill frame. The air drill frame includes pneumatic main lines and conveying lines for supplying particulate material to respective dispenser tubes of the dispensers. Each dispenser comprises a cultivator shovel or disc for forming a respective furrow with which the dispenser tube is aligned for depositing the metered particulate material therethrough into the furrow.

The product supplies typically include respective hopper bottoms 58 which direct the particulate material therein downwardly to respective metering wheels which define the metering devices. The metering wheels typically comprise wheels with axially oriented channels about the outer surface at circumferentially spaced positions for metering an amount of particulate material received in the channels from the tank thereabove to the pneumatic main lines below at an adjustable rate depending upon the rate of rotation of the metering devices.

Figure 8:
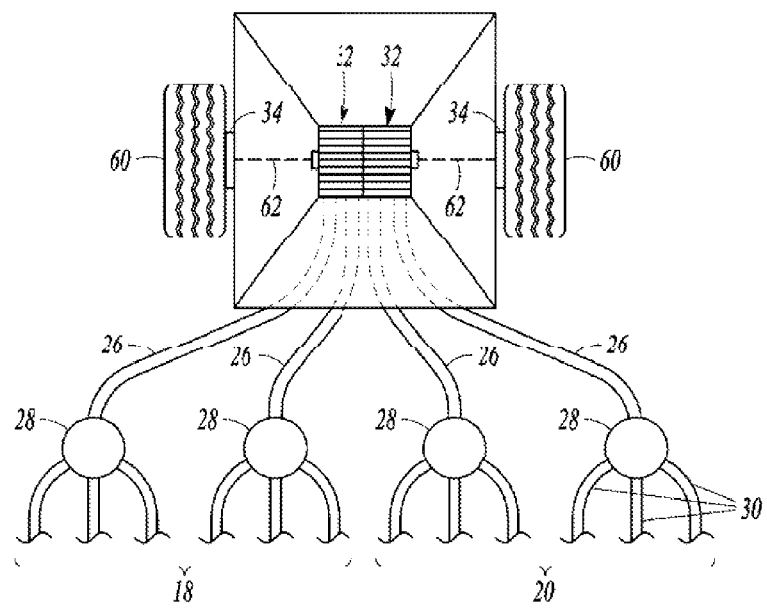
FIGS. 8 through 10 each schematically illustrate one respective embodiment of the metering system of the present invention applied to an agricultural air seeder.

Turning now particularly to the embodiment of FIG. 8, the frame in this instance is divided into only two side sections corresponding to a left section and a right section. A single metering wheel is provided within a common tank which is split into a left section wheel and a right section wheel arranged to be rotated at independent rates for independently metering product to main lines therebelow associated with the left side sections or right side sections respectively. In the embodiment of FIG. 8 the seed cart is supported on laterally spaced apart left and right wheels 60 such that each section of the metering wheel defining one of the metering devices 32 is coupled by a suitable linkage to the respective one of the two wheels 60 of the cart so that the rotation of the metering device is proportional to the respective wheel with which it is associated. When passing through a curved section one wheel will thus rotate faster than the other so that the corresponding section of the metering wheel will rotate faster resulting in more product being metered to the side of the frame with a greater forward ground speed.

Figure 9:
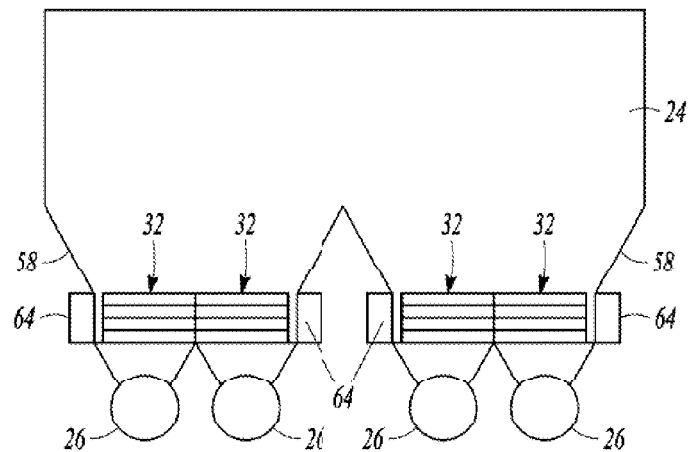

Turning now to the embodiment of FIG. 9 each separate tank on a seed cart may be designated into a greater number of individual metered sections by separating a bottom of the tank into a plurality of separate hopper bottoms which commonly communicate with a common tank area thereabove. Each separate hopper bottom 58 permits a split metering wheel to be supported therein comprising two axially abutted sections of wheel rotated about a common axis at independent rates. Each separate section of metering wheel defines a respective metering device 32 in communication with a respective main line. Each section of metering wheel is driven to rotate at its respective set rate proportional to its respective input speed determined by the computer controller by a respective control 64 which controls the rate of that section of the metering wheel which in turn controls the rate delivered to the main line and thus the rate to all of the product dispensers of the respective designated frame section associated therewith. In the illustrated embodiment two hopper bottoms of a common tank are provided with two sections of metering wheel within each hopper bottom such that four independent metering devices 32 independently meter product from a common tank to four independent main lines directed towards different sections of the frame. The different sections may include two left side sections and two right side sections, or two center sections and one left section and one right section as examples.

Figure 10:
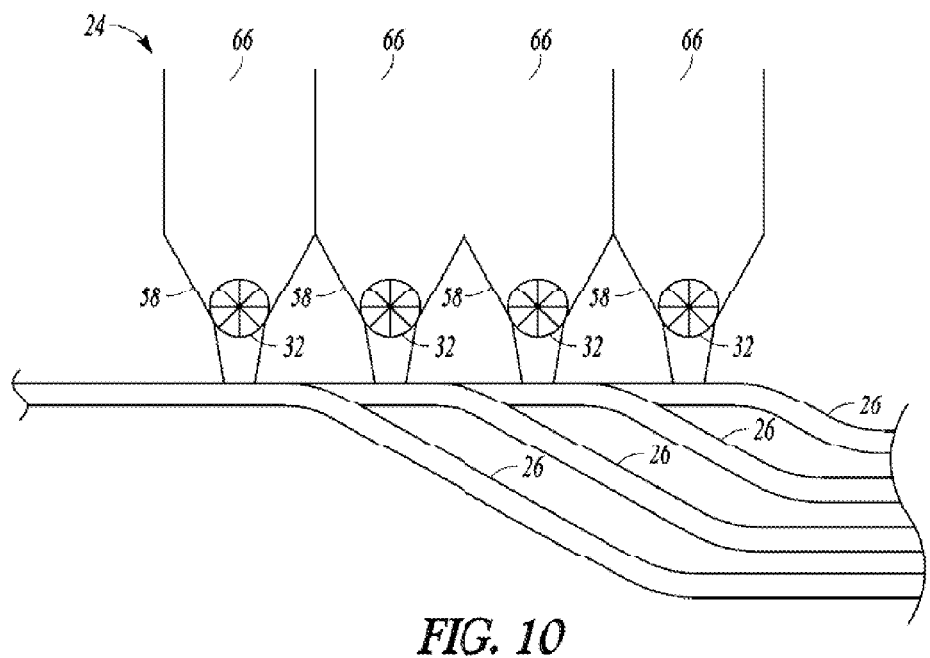

Turning now to the embodiment of FIG. 10, in further arrangements, the product supply 24 may comprise a plurality of individual tanks 66 on the seed cart in which each tank is provided with its own respective metering device 32 associated only with that tank for communication with only main lines associated with one common frame section of the implement frame. In this instance each tank is only associated with one frame section such that the metering system of that tank only meters product to the designated frame section. By operating the metering systems of the different tanks independently of one another, independent metering is again provided to different sections of the implement frame.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A seeder system for applying a granular input product to an agricultural field at variable rates between sections comprising:
   a product supply configured for storing the granular input product;
   a plurality of product dispensers, each of the product dispensers of the plurality of product dispensers at respective sections of a plurality of sections of the seeder system;
   a plurality of pneumatic lines configured to convey input product therethrough, each of the plurality of pneumatic lines are associated with the respective sections, and each of the plurality of pneumatic lines extends between at least the product supply and at least one product dispenser associated with the respective sections; and
   a metering system including:
      a plurality of metering wheels in communication with the product supply, each metering wheel of the plurality of metering wheels associated with the respective sections of the plurality of sections,
      a controller configured to independently control the rates of rotation of each metering wheel of the plurality of metering wheels relative to the rates of rotation of the other metering wheels, and
      wherein each metering wheel is configured to introduce the granular input product to respective pneumatic lines of the plurality of pneumatic lines according to the independently controlled rates of rotation, and each of the product dispensers is configured to dispense the granular input product at the respective sections according to the independently controlled rates of rotation.

2. The seeder system of claim 1, wherein the controller includes a speed input for each respective section, the rates of rotation of each metering wheel are independently controlled according to each respective speed input.

3. The seeder system of claim 1, wherein the rate of rotation of each metering wheel includes one of the following: no rotation, a maximum rate or rotation, or a plurality of rates of rotation therebetween.

4. The seeder system of claim 1, wherein the product supply includes a plurality of hopper bottoms, each hopper bottom is associated with one or more respective sections and separate from other hopper bottoms.

5. The seeder system of claim 4, wherein each metering wheel of the plurality of metering wheels is located within respective hopper bottoms of the plurality of hopper bottoms to introduce input product from the respective hopper bottoms to the pneumatic line of each of the respective sections.

6. The seeder system of claim 1, wherein each section of the plurality of sections includes a frame section, each frame section is non-overlapping with adjacent frame sections across a lateral width of the frame sections and each frame section includes a plurality of product dispensers.

7. The seeder system of claim 1, wherein the seeder system is an air seeder system and at least one section includes a plurality of respective product dispensers, the pneumatic line includes a pneumatic main line coupled between the respective metering wheel and a manifold, a plurality of pneumatic conveying lines are coupled between the manifold and the plurality of respective product dispensers.

8. The seeder system of claim 1, wherein the each section includes one product dispenser.

9. An air seeder system comprising:
   at least one product supply configured for storing granular input product;
   a plurality of sections including at least first and second sections:
   the first section includes a first metering wheel, a first pneumatic line, and a first product dispenser, wherein the first pneumatic line extends at least between the first product dispenser and the at least one product supply, and the first metering wheel is in communication with the at least one product supply, wherein the first metering wheel is configured to introduce granular input product to the first pneumatic line and dispense granular input product through the first product dispenser according to a first variable rate of rotation of the first metering wheel, and
   the second section includes a second metering wheel, a second pneumatic line, and a second product dispenser, wherein the second pneumatic line extends at least between the second product dispenser and the at least one product supply, and the second metering wheel is in communication with the at least one product supply, wherein the second metering wheel is configured to introduce granular input product to the second pneumatic line and dispense granular input product through the second product dispenser according to a second variable rate of rotation of the second metering wheel; and
   a controller configured to independently control at least the first and second variable rates of rotation of the first and second metering wheels, respectively, and the first and second product dispensers are configured to dispense the granular input product according to the independently controlled first and second variable rates of rotation.

10. The air seeder system of claim 9, wherein the controller includes a speed input for each respective section, the first and second variable rates of rotation of each metering wheel are independently controlled according to each respective speed input.

11. The air seeder system of claim 9, wherein the independently controlled first and second variable rates of rotation of each metering wheel includes one of the following: no rotation, a maximum rate or rotation, or a plurality of rates of rotation therebetween.

12. The air seeder system of claim 9, wherein the at least one product supply includes a first hopper bottom and a second hopper bottom, the first hopper bottom associated with the first section and the second hopper bottom associated with the second section.

13. The air seeder system of claim 12, wherein the first metering wheel introduces input product from the first hopper bottom to the first pneumatic line and the second metering wheel introduces input product from the second hopper bottom to the second pneumatic line.

14. The air seeder system of claim 9, wherein at least the first section includes a plurality of product dispensers.

15. The air seeder system of claim 14, further comprising at least one manifold and a plurality of pneumatic conveying lines, the pneumatic line includes a first pneumatic main line coupled between the first metering wheel and the manifold, each pneumatic conveying line is coupled between the manifold and the plurality of product dispensers.

16. The air seeder system of claim 9, wherein each section includes one product dispenser.

17. A method of dispensing granular input product from an implement, the method comprising:
   dispensing the granular input product from a plurality of sections, the granular input product dispensed at independent dispensation rates at each of the sections of the plurality of sections;
   wherein dispensing the granular input product at the independent dispensation rate at each respective section of the plurality of sections includes:
     determining a rate of rotation of a metering wheel of the respective section, the rate of rotation corresponding to the independent dispensation rate,
     rotating the metering wheel at the selected rate of rotation to introduce the granular input product to a pneumatic line from a product supply, and
     conveying the granular input product through the pneumatic line to one or more product dispensers according to the independent dispensation rate and corresponding rate of rotation of the metering wheel; and
     repeating dispensing the granular input product at the independent dispensation rate for each metering wheel of a plurality of metering wheels, the rate of rotation of each metering wheel is independent of the rates of rotation of the other metering wheels.

18. The method of claim 17, wherein determining the rate of rotation of the metering wheel and rotating the metering wheel at the selected rate of rotation for each respective section are independently controlled by a controller.

19. The method of claim 17, wherein determining the rate of rotation of the metering wheel includes providing a speed input for each respective section, the rates of rotation of each metering wheel corresponds to each respective speed input.

20. The method of claim 19, wherein providing the speed input for each respective section includes providing a speed input of one of the following: no rotation, a maximum rate or rotation, or a plurality of rates of rotation therebetween.

21. The method of claim 17, wherein introducing input product to the pneumatic line includes conveying granular input product from the product supply through one or more hopper bottoms to each of the pneumatic lines according to the independent rate of rotation of each metering wheel, each hopper bottom is associated with a respective pneumatic line.

22. The method of claim 17, wherein introducing granular input product to the pneumatic main line includes dispensing input product through a plurality of product dispensers.

23. The method of claim 22, wherein introducing granular input product to the pneumatic line includes introducing granular input product to a pneumatic main line and a plurality pneumatic conveying lines in communication with the pneumatic main line, each of the pneumatic conveying lines is associated with a respective product dispenser of the plurality of product dispensers.

24. The method of claim 23, wherein introducing granular input product to the pneumatic main line further comprises introducing granular input product to at least one manifold coupled between the pneumatic main line and the plurality of product dispensers, the plurality of pneumatic conveying lines couples the manifold to each of the respective product dispensers.

* * * * *